United States Patent [19]
Matsuda

[11] Patent Number: 6,149,089
[45] Date of Patent: Nov. 21, 2000

[54] FISHING SPINNING REEL

[75] Inventor: Kazuyuki Matsuda, Tokyo, Japan

[73] Assignee: Daiwa Seiko, Inc., Tokyo, Japan

[21] Appl. No.: 09/256,181

[22] Filed: Feb. 24, 1999

[30] Foreign Application Priority Data

Feb. 26, 1998 [JP] Japan .................................. 10-062048

[51] Int. Cl.[7] .................................................. A01K 89/00
[52] U.S. Cl. ........................ 242/319; 242/246; 242/303
[58] Field of Search .................................... 242/224, 246, 242/303, 318, 319

[56] References Cited

U.S. PATENT DOCUMENTS

| 2,486,559 | 11/1949 | Fuller | 242/319 |
|---|---|---|---|
| 2,884,211 | 4/1959 | Holahan, Jr. | 242/319 |
| 4,911,378 | 3/1990 | Hitomi | 242/319 X |
| 5,149,008 | 9/1992 | Oi | 242/319 X |
| 5,156,351 | 10/1992 | Citadini | 242/319 X |
| 5,322,238 | 6/1994 | Hitomi | 242/319 X |
| 5,603,465 | 2/1997 | Henriksson | 242/246 |
| 5,988,547 | 11/1999 | Koelewyn | 242/246 |
| 5,996,918 | 12/1999 | Nanbu | 242/319 X |

FOREIGN PATENT DOCUMENTS

| 3-67562 | 7/1991 | Japan . |
|---|---|---|
| 3-91776 | 9/1991 | Japan . |

Primary Examiner—Donald P. Walsh
Assistant Examiner—Emmanuel M. Marcelo
Attorney, Agent, or Firm—Liniak, Berenato, Longacre & White

[57] ABSTRACT

A fishing spinning reel includes: a drag braking knob imparting a drag braking force to a spool, an opposite member opposite to the drag braking knob, a sliding contact section for waterproof arranged in one of the drag braking knob and the opposite member, and a sliding contact member for waterproof arranged in the other of the drag braking knob and the opposite member. The sliding contact member for waterproof includes a contact portion being elastically deformable and slidably contactable with a sliding surface of the sliding contact section for waterproof.

6 Claims, 10 Drawing Sheets

FISHING SPINNING REEL

BACKGOURND OF THE INVENTION

1. Field of the Invention

The present invention relates to a fishing spinning reel in which an opposite member such as a spool or a reel body in which a drag braking mechanism is housed is made waterproof.

2. Description of the Related Art

A spool of a related fishing spinning reel includes: a through-hole into which a spool shaft is inserted, formed at the center of the spool; a recess for housing a drag braking mechanism, formed on the front side of the spool; and a drag braking knob screwed to the spool shaft inserted into the through-hole.

Due to the above arrangement, water enters the spool from the front and the rear side, and the drag braking mechanism is corroded. For the above reasons, it is impossible to obtain a stable drag performance, and problems tend to occur in its operation.

In order to solve the above problems caused by intrusion of water, for embodiment, as disclosed in Japanese Unexamined Utility Model Unexamined Publication Nos. 3-67562 and 3-91776, proposals are made in which waterproof treatment is conducted between the spool and the drag braking knob.

However, in the structure disclosed in the former utility model publication, the following problems may be encountered. The annular protrusion for preventing the intrusion of water is formed integrally with the member for holding the drag braking mechanism. Therefore, the annular protrusion for preventing the intrusion of water is made of hard material. Accordingly, it is impossible to provide a waterproof effect, and further it-becomes difficult to adjust a drag braking force.

In the structure disclosed in the latter utility model publication, the following problems may be encountered. When dust or sand enters the circumferential grooves of the elastic seal, it becomes difficult for the contact surface to uniformly come into contact with the elastic seal in the case where the elastic seal is pushed in the process of drag braking control. As a result, gap may be caused between the seal and the contact surface.

In the structures of both the former and the latter utility model publications, when the reel is dipped in water, water enters the spool from the rear side thereof.

SUMMARY OF THE INVENTION

In view of the above problems, an object of the present invention is to provide a fishing spinning reel, with a stable drag performance which water is prevented from entering the opposite member in which the drag braking mechanism is housed so that the occurrence of inferior operation can be prevented.

In order to solve the above problems, there is provided a fishing spinning reel including: a drag braking knob imparting a drag braking force to a spool, an opposite member opposite to the drag braking knob, a sliding contact section for waterproof arranged in one of the drag braking knob and the opposite member, and a sliding contact member for waterproof arranged in the other of the drag braking knob and the opposite member. The sliding contact member for waterproof includes a contact portion being elastically deformable and slidably contactable with a sliding surface of the sliding contact section for waterproof.

Further, according to the present invention, there is provided a fishing spinning reel including: a drag braking mechanism imparting a drag braking force to a spool, the drag braking mechanism having a drag braking knob being rotatable; an opposite member opposite to the drag braking knob so as to receive the drag braking mechanism between the opposite member and the drag braking knob; a first sliding contact section for waterproof arranged in one of the drag braking knob and the opposite member; and a first sliding contact member for waterproof arranged in the other of the drag braking knob and the opposite member, the first sliding contact member for waterproof including a first contact portion elastically deformable and slidably contactable with a first sliding surface of the first sliding contact section for waterproof; a second sliding contact member for waterproof arranged around a spool shaft on an opposite side to the drag braking knob with respect to the opposite member, the second sliding contact member having a second contact portion; a second sliding contact section for waterproof opposing to the second sliding contact member for waterproof, the second sliding contact section defining a sliding surface to be contacted with the second contact portion of the second sliding contact member, whereby the drag braking mechanism arranged in the opposite member is made waterproof in the axial direction.

DETAILED DESCRIPTION OF THE PREFERRED EMBODIMENTS

Figure 1:
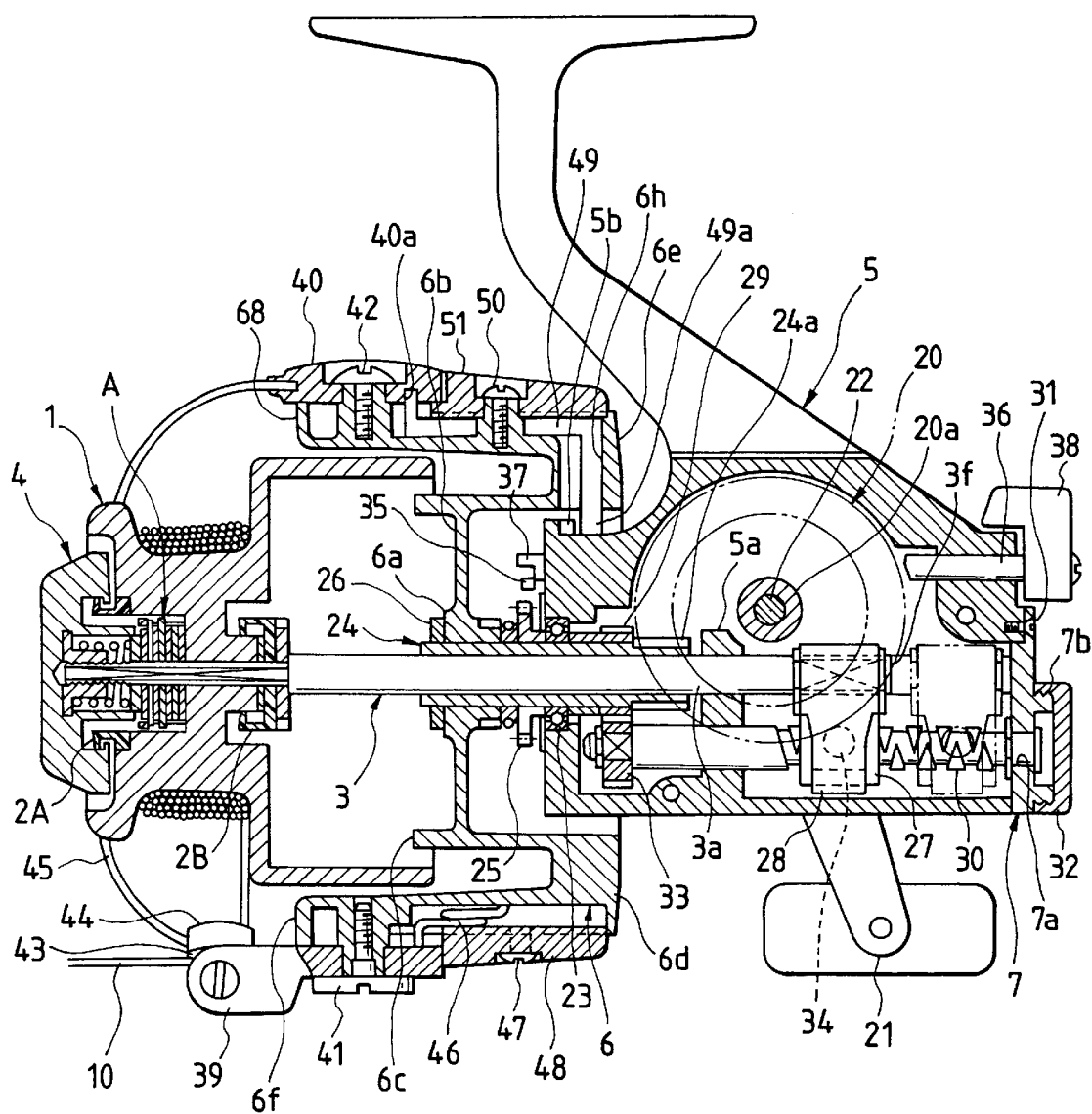
FIG. 1 is a cross-sectional side view of a fishing spinning reel according to a first embodiment of the present invention.

Referring to embodiments shown in the drawings, the present invention will be explained below.

[First Embodiment]

Figure 2:
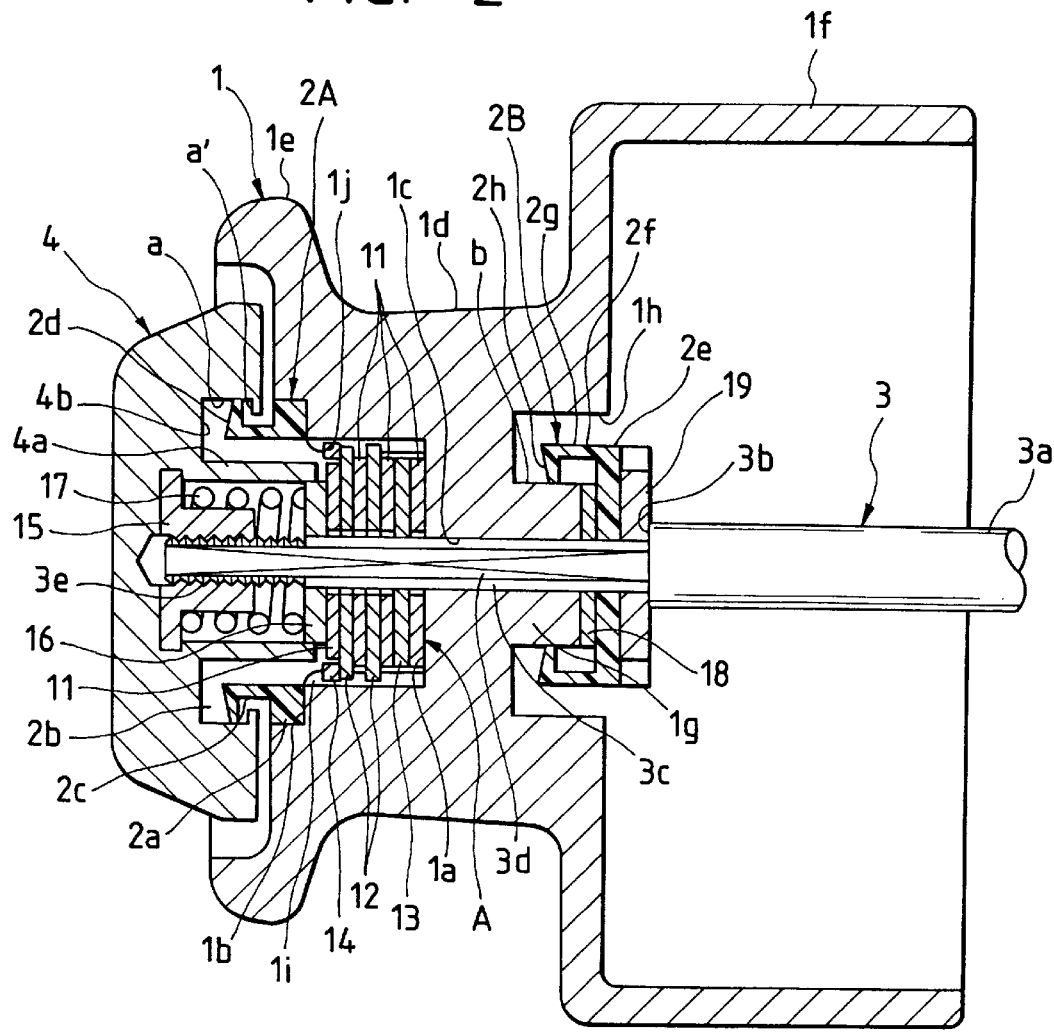
FIG. 2 is an enlarged cross-sectional side view of a primary portion of an opposite member composed of a spool according to the first embodiment.
Figure 3A:
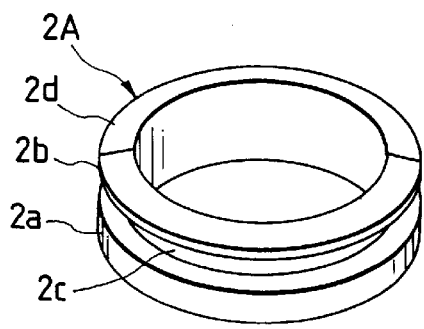
FIGS. 3A and 3B are perspective views of a sliding contact member for waterproof according to the first embodiment.
Figure 3B:
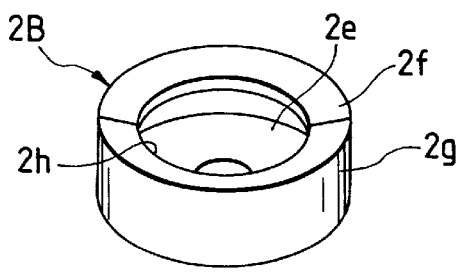

FIGS. 1 to 3 are views showing the first embodiment. FIG. 1 is a cross-sectional side view of a fishing spinning reel, FIG. 2 is a cross-sectional side view showing a primary portion of an opposite member composed of a spool, FIG. 3A is a perspective view of a sliding contact member for waterproof arranged on the front side, and 3B is a perspective view of another sliding contact member for waterproof arranged on the rear side.

The first embodiment is a front drag type fishing spinning reel. The opposite member 1 composed of a spool includes: a deep recess 1a located at the center of the front portion; a shallow recess 1b used for attaching a sliding contact member for waterproof 2A arranged forwardly and outside the front recess 1a; a through-hole 1c formed at the center; a fishing line winding drum section 1d, on the outer circumference of which a fishing line 10 is wound; a flange section 1e formed on the front side; a cylindrical section 1f of a large diameter on the rear side; a shaft cylinder section 1g arranged inside on the rear side; and a sliding contact section 1h for waterproof composed of a recess in the periphery on the outside of the shaft cylinder section 1g.

In the recess 1a, there are formed two grooves 1i in the axial direction, and also there is formed an engaging circumferential groove 1j, which is composed of a recess, in the circumferential direction of the inner circumference on the front side in the recess 1a, wherein this engaging circumferential groove 1j is formed from the inner circumference to the outside in the radial direction.

In the recess 1a, there are provided friction plates 11 and braking plates 12, 13 of drag braking mechanism A, which are prevented from coming out by a stop ring 14 engaged with an engaging circumferential groove 1j.

Protrusions formed on the outer circumference of the braking plate 12 are engaged with the two grooves 1i, so that the braking plate 12 can not be rotated.

The sliding contact member for waterproof 2A on the front side is constructed by a ring-shaped body 2a made of rubber or soft synthetic resin, and an elastic sliding contact section 2b. The sliding contact section 2b is constructed by a cylindrical section 2c and a flange section 2d protruding from the cylindrical section 2c to the outside in the radial direction.

The main body 2a is engaged with and fixed to the shallow recess 1b.

The spool shaft 3 inserted into the central through-hole 1c of the opposite member 1 composed of the spool includes: a large diameter section 3a; a small diameter section 3c arranged on the forward end side of the large diameter section 3a via a step section 3b; a rotation locking section 3d arranged on the outer circumference of the small diameter section 3c; and a screw section 3e arranged at the forward end of the small diameter section 3c.

The front side small diameter section 3c of the spool shaft 3 is inserted into the through-hole 1c.

The friction plates 11 and the braking plates 12, 13 of drag braking mechanism A are engaged with the outer circumference of the small diameter section 3c in the recess 1a, and the braking plate 13 is locked by the rotation locking section 3d.

The nut 15 embedded in the drag braking knob 4 is screwed to the screw section 3e arranged at the forward end of the small diameter section 3c.

Drag braking mechanism A includes: a friction plate 11; braking plates 12, 13; the friction plate 11 arranged on the front side of the front side braking plate 12; a pushing plate 16 arranged on the front side of the friction plate 11; and a coil-shaped spring 17 arranged in the drag braking knob 4.

The drag braking knob 4 is structured as follows. The nut 15 is embedded at the center of the drag braking knob 4. Outside the nut 15, there is provided a cylindrical section 4a. Outside the cylindrical section 4a, there is provided a sliding contact section for waterproof 4b composed of a recess.

It is possible to insert the pushing plate 16 into the inner circumference of the cylindrical section 4a. The coil-shaped spring 17 is inserted between the outer circumference of the nut 15 and the inner circumference of the cylindrical section 4a.

The sliding contact section 2b of the front side sliding contact member 2A for waterproof is inserted into the packed or sliding contact section 4b for waterproof composed of the recess. The flange section 2d slidably comes into contact with the outside sliding surface "a" in the sliding contact section 4b for waterproof composed of the recess.

In the opening of the sliding surface "a", there is provided a flange-shaped circumferential wall "a'" of small diameter which protrudes inward in the radial direction.

The spacer 18, another sliding contact member for waterproof 2B on the rear side and the click gear 19 are engaged with the outer circumference of the small diameter section 3c of the spool shaft 3 on the rear side of the shaft cylinder section 1g of the opposite member 1 composed of the spool. The spacer 18, another sliding contact member for waterproof 2B on the rear side and the click gear 19 are interposed between the shaft cylinder section 1g and the step section 3b.

Another sliding contact member for waterproof 2B on the rear side is composed of a disk-shaped body 2e and an elastic sliding contact section 2f. The sliding contact section 2f is constructed by a cylindrical section 2g and a flange section 2h protruding inward from the cylindrical section 2g in the radial direction.

The flange section 2h slidably comes into contact with the sliding surface "b" inside the sliding contact section for waterproof 1h composed of a recess on the outer circumference of the shaft cylinder section 1g.

As described above, the elastic sliding contact sections 2b, 2f are arranged in the sliding contact sections for waterproof 2A, 2B located on the front and the rear side, and further the flange sections 2d, 2h protruding in the radial direction of the sliding contact sections 4b, 1h for waterproof are arranged in the sliding contact sections 2b, 2f, so that they can slidably come into contact with the sliding surfaces "a", "b". Therefore, even if the flange sections 2d, 2h and the sliding surfaces "a", "b" are relatively moved from each other, waterproof can be positively accomplished.

Further, even if dust or sand is attached to the sliding contact sections for waterproof 4b, 1h composed of a recess, dust or sand can be scraped off by the flange sections 2d, 2h protruding in the radial directions when the flange sections 2d, 2h are moved. Accordingly, there is no possibility that the flange sections 2d, 2h are separated from the sliding surfaces "a", "b". Therefore, waterproof can be positively accomplished.

As described above, the flange section 2d of the sliding contact member 2A for waterproof on the front side slidably comes into contact with the sliding surface "a" of the sliding contact section 4b for waterproof outside the cylindrical section 4a, composed of a recess. Further, the flange section 2h of another sliding contact member 2B for waterproof on the rear side slidably comes into contact with the sliding surface "b" of the sliding contact section 1h for waterproof composed of the recess on the outer circumference of the shaft cylinder section 1g. Due to the above arrangement, even if the reel is dipped in water, it is possible to prevent water from entering the recess 1a of the opposite member 1 composed of the spool and also it is possible to prevent water from entering the through-hole 1c.

When the flange-shaped circumferential wall "a'" of small diameter, which protrudes inwardly in the radial direction, is formed into the opening of the sliding surface "a", it is possible to positively prevent foreign objects from entering inside.

The spool shaft 3 protrudes from the front side of the reel body 5.

In both side walls of the reel body 5, a rotary shaft 20a of a drive gear 20 is supported by bearings (not shown). A handle shaft 22 to which a handle 21 is fixed is detachably engaged with a central polygonal hole of the rotary shaft 20a, wherein the handle shaft 22 can be freely alternate on either side of the rotary shaft 20a.

At the front of the reel body 5, a rotary shaft cylinder 24 is pivotally supported by a bearing 23 and protruded to the front side.

A backstop ratchet wheel 25 and the rotor 6 are fixed onto the outer circumference of the rotary shaft cylinder 24 on the front side of the bearing 23 by a nut 26, wherein the backstop ratchet wheel 25 and the rotor 6 are engaged and locked so that they can not be rotated.

The base end of the rotary shaft cylinder 24 is pivotally supported by the bearing section 5a, and the drive gear 20 is meshed with a pinion 24a integrally formed on the front side of the base end. The rotor 6 is supported in such a manner that it can be rotated being linked with the rotation of the handle 21.

The large diameter section 3a of the spool shaft 3, at the forward end of which the opposite member 1 composed of the spool is attached, is slidably inserted into the central hole of the rotary shaft cylinder 24 in such a manner that the spool shaft 3 can be reciprocated in the longitudinal direction. A sliding piece 27 is attached to the rear end section 3f of the spool shaft 3 via an engaging plate 28.

An interlocking gear 29 is engaged with the rotary shaft cylinder 24 on the front side of the pinion 24a of the rotary shaft cylinder 24 in the reel body 5, wherein the interlocking gear 29 is locked so that it can not be rotated.

In the reel body 5, there is provided a traverse cam shaft 30 which is a sliding mechanism arranged in parallel to the spool shaft 3. In this case, the traverse cam shaft 30 is supported in such a manner that it is inserted into the bearing section 5a and the hole 7a of the support member 7 which is attached to the rear side of the reel body 5 by a screw 31.

On the rear side of the support member 7, there is formed a screw cylinder 7b to which a cap 32 is screwed.

At the forward end of the traverse cam shaft 30, there is provided a pinion 33 which is locked so that it can not be rotated. The pinion 33 is meshed with the above interlocking gear 29.

The sliding piece 27 is engaged with the traverse cam shaft 30, and a claw of an engagement portion 34 arranged in the sliding piece 27 is engaged with the traverse cam groove.

A backstop claw 35 faces the backstop ratchet wheel 25 in such a manner that the backstop claw 35 can be freely engaged with and disengaged from the backstop ratchet wheel 25.

On the front side of an operation rod 36 which is pivotally attached to the reel body 5, there is provided a backstop cam 37. At the operating rod 36 which protrudes outside from the rear side of the reel body 5, there is provided an operating knob 38.

The rotor 6 is attached to the rotary shaft cylinder 24 by a cylindrical section 6a. The rotor 6 includes: the cylindrical section 6a; a front wall 6b, a cylindrical section 6c of large diameter; and a pair of support arms 6f, 6g protruding to the front from the outer circumferences of the base sections 6d, 6e of the cylindrical section 6c of large diameter.

Outside the forward end portions of a pair of bail supporting arms 6f, 6g, there are provided one bail supporting member 39 and the other bail supporting member 40 which are supported by screws 41, 42 in such a manner that they can be freely inverted between the fishing line winding position and the fishing line discharging position An attaching section 44 of a fishing line guide roller 43 is attached to one bail supporting member 39.

A bail 45 is attached between the other bail supporting member 40 and the attaching section 44 of the fishing line guide roller 43.

In one bail supporting arm 6f, there is provided a torsion spring 46. One end thereof is received within the supporting arm 6f, and the other end is engaged with the bail supporting member 39. Therefore, one bail supporting member 39, the other bail supporting member 40, the attaching section 44 of the fishing line guide roller 43 and the bail 45 are put into the fishing line winding position and the fishing line discharging position by the energizing action of the torsion spring 46. The torsion spring 46 is covered with a cover 48 which is fixed by a screw 47.

In the other bail supporting arm 6g, there is provided an L-shaped inverting function lever 49 by which one bail supporting member 39, the other bail supporting member 40, the attaching section 44 of the fishing line guide roller 48 and the bail 45 are inverted from the fishing line discharging position to the fishing line winding position.

In the bail supporting arm 6g, the inverting function lever 49 is covered with a cover 51 which is fixed by a screw 50.

One end of the inverting function lever 49 is inserted into the hole 40a of the bail supporting member 40, and the other end 49a of the inverting function lever 49 is inserted into the hole 6h formed downward in the base section 6e.

The other end 49a of the inverting function lever 49 faces the cam 5b arranged in the reel body 5 in such a manner that the inverting function lever 49 can be contacted with the cam 5b.

When the drag braking force is adjusted, the drag braking knob 4 is rotated. Then, the coil-shaped spring 17 is compressed by the nut 15. Therefore, drag braking mechanism A arranged in the recess 1a is pressed, so that the drag braking force can be adjusted.

When the drag braking knob 4 is rotated and advanced at this time, the cylindrical section 4a is advanced while the flange section 2d of the sliding contact member for waterproof 2A on the front side slidably comes into contact with the sliding surface "a" of the sliding contact section for waterproof 4b composed of the recess outside the cylindrical section 4a.

When the opposite member 1 composed of the spool is rotated by a tension of the fishing line 10 against the drag braking force, while the flange section 2d of the sliding contact member for waterproof 2A on the front side is slidably coming into contact with the sliding surface "a" of the sliding contact section for waterproof 4b composed of the recess outside the cylindrical section 4a, and while the flange section 2h of another sliding contact member for waterproof 2B on the rear side is slidably coming into contact with the sliding surface "b" inside the sliding contact section for waterproof 1h composed of the recess on the outer circumference of the shaft cylinder section 1g, the opposite member 1 composed of the spool is rotated.

The above fishing spinning reel operates as follows. In the condition that one bail supporting member 39 and the other bail supporting member 40 are set at the fishing line winding positions, when the handle 21 is rotated in a direction in which the fishing line 10 can be wound round the opposite member 1 composed of the spool, the drive gear 20 is rotated, and the rotary shaft cylinder 24 and the rotor 6 are normally rotated via the pinion 24a.

Further, the traverse cam shaft 30 is interlockingly rotated via the interlocking gear 29 and the pinion 33. Due to the foregoing, the sliding piece 27, the spool shaft 3 and the opposite member 1 composed of the spool are reciprocated in the longitudinal direction.

In the case where the rotor 6 is prevented from rotating reversely, the operating knob 38, the operating rod 36 and the backstop claw 35 are rotated, and the backstop claw 35 is engaged with the backstop ratchet wheel 25.

When the reverse rotation of the rotor 6 is prevented and fishing is conducted and also when the opposite member 1 composed of the spool is reversely rotated while the fishing line 10 is being pulled by the drag of fish, a drag braking force acts between the opposite member 1 composed of the spool and the spool shaft 3.

When the tackle is cast and the fishing line 10 is discharged to a distant position, the bail support members 39, 40 are inverted to the fishing line discharging position and the fishing rod is swung energetically.

When the bail support members 39, 40 are inverted to the fishing line discharging position, the other end 49a of the inverting function lever 49 is advanced.

When the other end 49a of the inverting function lever 49 is advanced, it faces a contact position with the cam 5b arranged in the reel body 5.

When the handle 21 is rotated in a direction so that the fishing line 10 can be rotated round the opposite member 1 composed of the spool after the tackle has been cast, the drive gear 20 is rotated, and the rotary shaft cylinder 24 and the rotor 6 are normally rotated via the pinion 24a.

When the rotor 6 is normally rotated, the other end 49a of the inverting function lever 49 comes into pressure contact with the cam 5b of the reel body 5 and is pushed backward, and the bail supporting members 39, 40 are automatically inverted into the fishing line winding position.

When the fishing spinning reel is structured as described above, even if dust or sand is attached to the sliding contact members for waterproof 2A, 2B, there is no possibility that the sliding contact sections 2b, 2f are separated from the sliding surfaces "a", "b". Accordingly, waterproof can be positively accomplished.

The elastic sliding contact sections 2b, 2f are provided in the front 2A and the rear sliding contact member 2B for waterproof. In the elastic sliding contact sections 2b, 2f, the flange sections 2d, 2h which protrude in the radial directions of the sliding contact sections 4b, 1h for waterproof composed of recesses are provided. The flange sections 2d, 2h are slidably contacted with the sliding surfaces "a", "b". Therefore, even if the flange sections 2d, 2h and the sliding surfaces "a", "b" are relatively moved, waterproof can be positively accomplished.

Therefore, even if dust or sand is attached to the sliding contact sections for waterproof 4b, 1h composed of a recess, dust or sand can be scraped off by the flange sections 2d, 2h protruding in the radial directions when the flange sections are moved. Accordingly, there is no possibility that the flange sections 2d, 2h, are separated from the sliding surfaces "a", "b". Therefore, waterproof can be positively accomplished.

The flange section 2d of the sliding contact member 2A for waterproof on the front side slidably comes into contact with the sliding surface "a" of the sliding contact section 4b for waterproof outside the cylindrical section 4a, composed of a recess. Further, the flange section 2h of another sliding contact member 2B for waterproof on the rear side slidably comes into contact with the sliding surface "b" of the sliding contact section 1h for waterproof composed of the recess on the outer circumference of the shaft cylinder section 1g. Due to the above arrangement, even if the reel is dipped in water, it is possible to prevent water from entering the recess 1a of the opposite member 1 composed of the spool and also it is possible to prevent water from entering the through-hole 1c.

[Second Embodiment]

Figure 4:
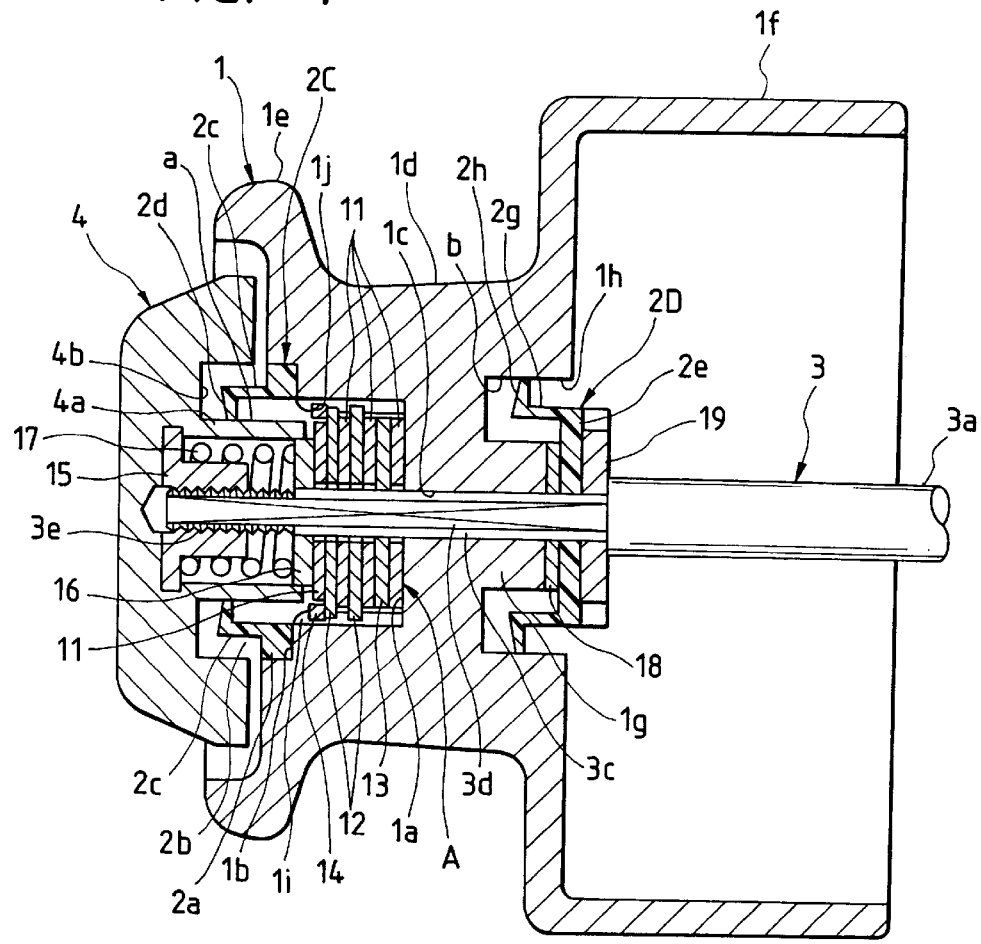
FIG. 4 is an enlarged cross-sectional side view of a primary portion of an opposite member composed of a spool according to a second embodiment of the present invention.
Figure 5A:
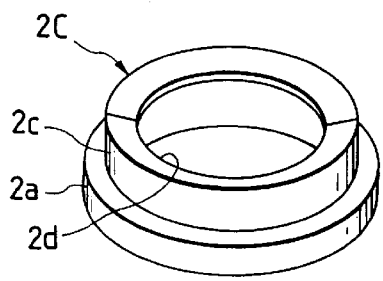
FIG. 5A is a perspective view of a sliding contact member for waterproof arranged on the front side according to the second embodiment.
Figure 5B:
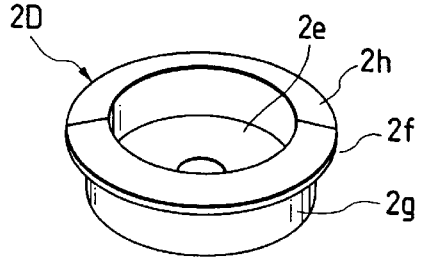
FIG. 5B is a perspective view of another sliding contact member for waterproof arranged on the rear side according to the second embodiment.

FIGS. 4 and 5 are views showing a second embodiment of the present invention. FIG. 4 is an enlarged cross-sectional side view of the primary portion of the opposite member composed of the spool. FIG. 5A is a perspective view of the sliding contact member for waterproof on the front side, and FIG. 5B is a perspective view of another sliding contact member for waterproof on the rear side.

In the second embodiment, the flange section 2d of a sliding contact member for waterproof 2C on the front side is formed reversely to the flange section 2d of the sliding contact member for waterproof 2A of the first embodiment, and the flange section 2h of another sliding contact member for waterproof 2D on the rear side is formed reversely to the flange section 2h of the sliding contact member for waterproof 2B of the first embodiment. Other points of structure are substantially the same as those of the first embodiment.

[Third Embodiment]

Figure 6:
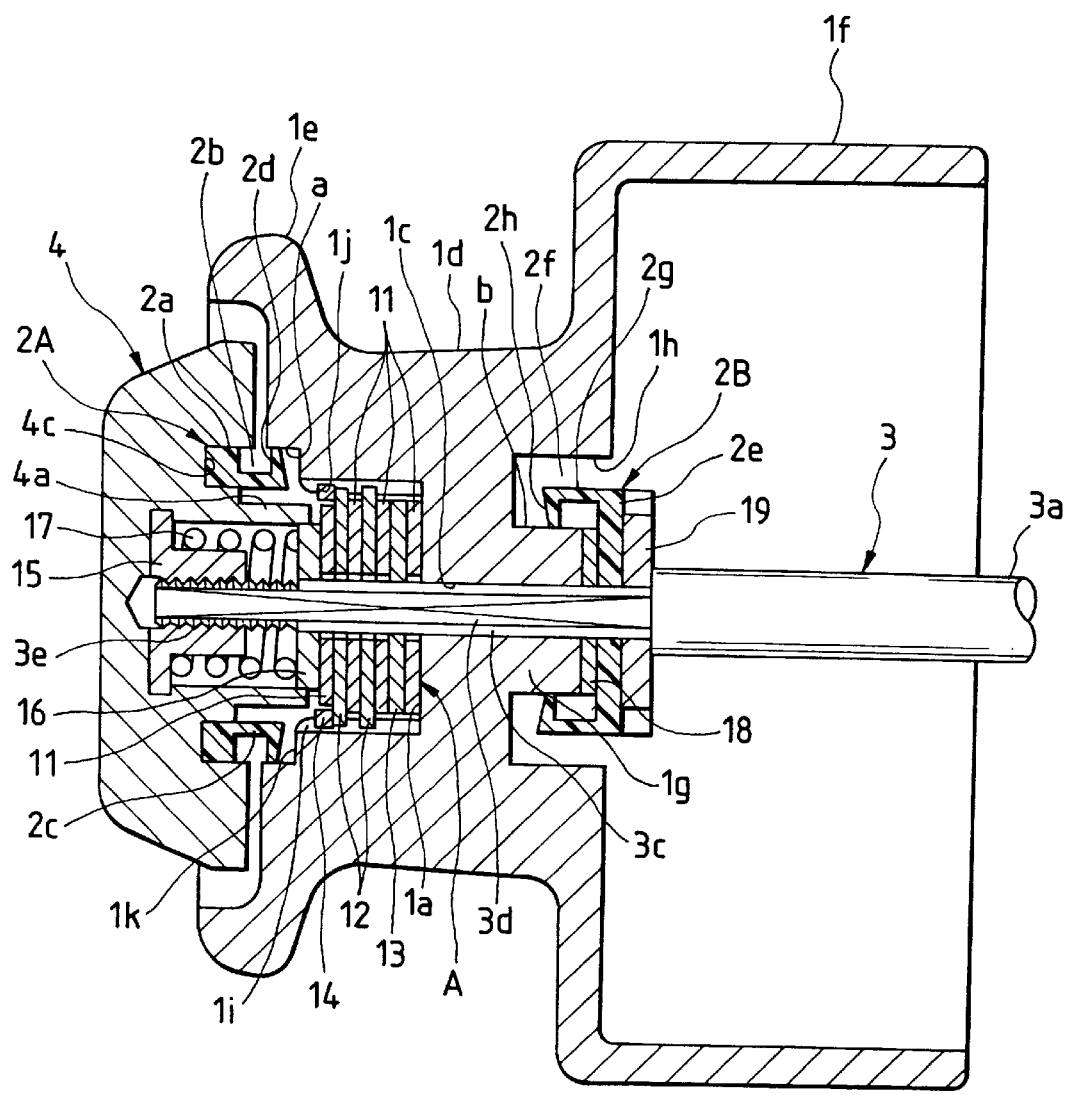
FIG. 6 is an enlarged cross-sectional side view of a primary portion of an opposite member composed of a spool according to a third embodiment of the present invention.

FIG. 6 is a view showing a third embodiment of the present invention. FIG. 6 is an enlarged cross-sectional side view of the opposite member composed of the spool.

In the third embodiment, outside the recess 1a on the front side of the opposite member 1 composed of the spool, there is formed a sliding contact section for waterproof 1k composed of a recess.

Outside the cylindrical section 4a of the drag braking knob 4, there is formed a shallow recess 4c for attaching the sliding contact member for waterproof 2A arranged on the front side.

The body 2a of the sliding contact member for waterproof 2A arranged on the front side is engaged with and fixed to the shallow recess 4c.

The sliding contact section 2b of the sliding contact member for waterproof 2A arranged on the front side is inserted into the sliding contact section for waterproof 1k composed of a recess, and the flange section 2d is slidably contacted with the sliding surface "a" arranged outside the sliding contact section for waterproof 1k composed of a recess.

Other points of structure are the same as those of the first embodiment.

[Fourth Embodiment]

Figure 7:
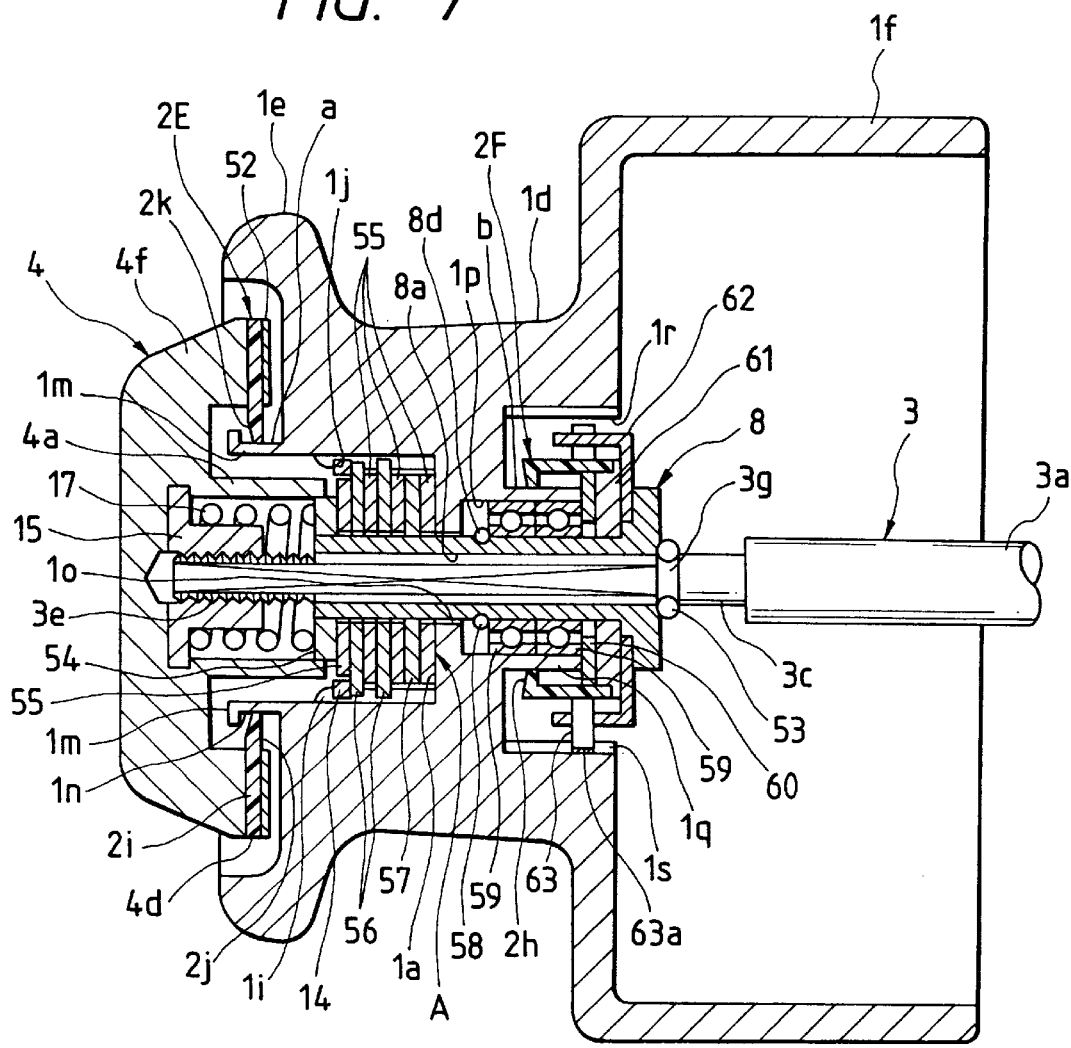
FIG. 7 is an enlarged cross-sectional side view of a primary portion of an opposite member composed of a spool according to a fourth embodiment of the present invention.
Figure 8:
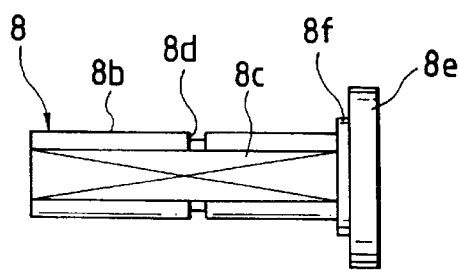
FIG. 8 is a side view of a spool metal member according to the fourth embodiment.

FIGS. 7 and 8 are views showing a fourth embodiment of the present invention. FIG. 7 is an enlarged cross-sectional side view of the opposite member composed of the spool. FIG. 8 is a side view showing a spool metal member.

In the fourth embodiment, outside the recess 1a in the front portion of the opposite member 1 composed of the spool, there is provided a cylindrical section 1m which protrudes to the front side. On the outer circumference of the cylindrical section 1m, there is formed a sliding contact section for waterproof in composed of a recess.

The sliding contact member for waterproof 2E arranged on the front side is fixed onto the rear end surface 4d of the flange section 4f of the drag braking knob 4.

The sliding contact member for waterproof 2E on the front side is formed into a disk shape, and the body 2i is fixed onto the rear end surface 4d of the drag braking knob 4 by the washer 52 and a screw (not shown).

The elastic sliding contact section 2j of the sliding contact member for waterproof 2E on the front side is protruded toward the sliding contact section for waterproof in composed of a recess, and the flange section 2k is formed at the forward end.

The flange section 2k is slidably contacted with the sliding surface "a" outside the sliding contact section for waterproof in composed of a recess.

At the center of the opposite member 1 composed of the spool, there is formed a through-hole 1o of large diameter which is larger than the above through-hole 1c, and also there is formed a recess 1p on the rear side. The spool metal member 8 is inserted into the through-hole 1o.

Outside the recess 1p, there is formed a cylindrical section 1q. Further, there is formed a sliding contact section for waterproof 1r, which is composed of a recess outside the cylindrical section 1q.

On the inner circumference outside the sliding contact section for waterproof 1r composed of a recess, there is provided a tooth section 1s used for clicking.

At the center of the spool metal member 8, there is formed a through-hole 8a into which the small diameter section 3c of the spool shaft 3 is inserted. The spool metal member 8 includes: a locking section 8c for preventing rotation which is arranged on the outer circumference 8b; a circumferential groove 8d arranged in the middle of the outer circumference 8b; a flange section 8e of large diameter arranged at one end; and a middle diameter section 8f which is a step section.

On the front side of the small diameter section 3c of the spool shaft 3, there is formed a circumferential groove 3g in which an O-ring 53 is engaged.

The pushing plate 54, the friction plate 55 and the braking plates 56, 57 of drag braking mechanism A are engaged with the outer circumference on the front side of the spool metal member 8, and the braking plate 57 is locked by the locking section 8c so that braking plate 57 can not be rotated.

In the circumferential groove 8d, there is provided an O-ring 58. There are provided ball bearings 59, 59 in a space formed between the outer circumference of the spool metal member 8 on the rear side of O-ring 58 and the cylindrical section 1q.

A spacer 60 and a disk-shaped support member 61 are engaged with the outer circumference 8b on the rear side of the ball bearing 59.

A cylindrical body 62 having a bottom is engaged with the outer circumference of the middle diameter section 8f, and a click spring 63 is supported by the cylindrical body 62 having a bottom.

The claw 63a of the click spring 63 is engaged with the tooth section 1s for clicking.

The elastic sliding contact section 2f of another sliding contact member for waterproof 2F arranged on the rear side is fixed onto the outer circumference of the support member 61.

The flange section 2h of the sliding contact section 2f is slidably contacted with the sliding surface "b" of the sliding contact section for waterproof 1r composed of a recess.

Other points of structure are the same as those of the first embodiment.

In this connection, the support member 61 and another sliding contact member for waterproof 2F arranged on the rear side may be integrated into one body.

[Fifth Embodiment]

Figure 9:
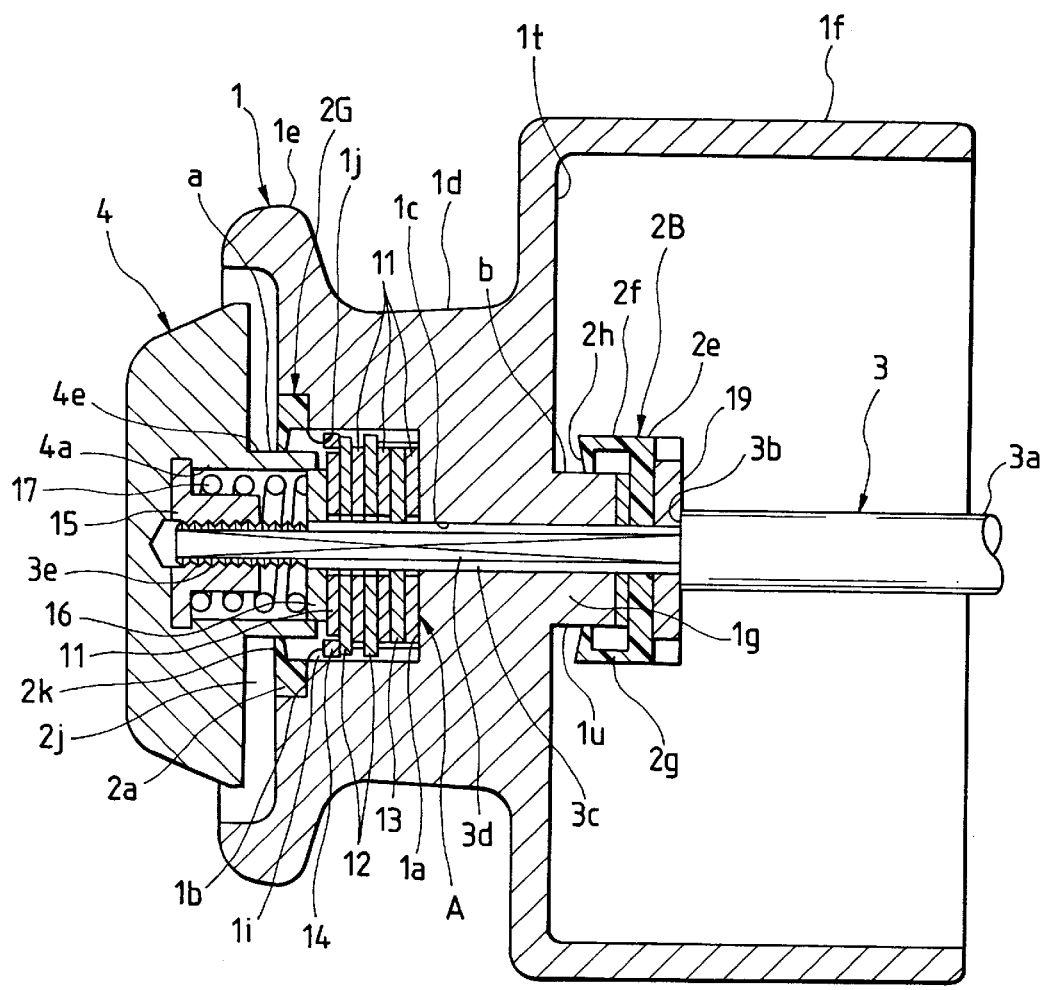
FIG. 9 is a cross-sectional side view of a fishing spinning reel in a fifth embodiment of the present invention.

FIG. 9 is a view showing a fifth embodiment of the present invention. FIG. 9 is a cross-sectional side view of a fishing spinning reel.

In the fifth embodiment, outside the recess 1a in the front portion of the opposite member 1 composed of a spool, there is formed a shallow recess 1b used for attaching a sliding contact member for waterproof 2G arranged on the front side.

The outside of the cylindrical section 4a of the drag braking knob 4 is the sliding contact section for waterproof 4e, and the outer circumferential surface is the sliding surface "a".

The main body 2a of the sliding contact member for waterproof 2G on the front side is engaged with and fixed to the shallow recess 1b, and the flange section 2k is formed at the forward end of the elastic sliding contact section 2j of the sliding contact member for waterproof 2G.

The sliding contact section 2j of the front side sliding contact member for waterproof 2G is inserted outside the cylindrical section 4a of the drag braking knob 4, and the flange section 2k slidably comes into contact with the sliding surface "a" on the outer circumference of the sliding contact section for waterproof 4e.

On the rear side of the opposite member 1 composed of the spool, there is provided a shaft cylinder section 1g which protrudes from the back surface 1t in the cylindrical section 1f of large diameter. A sliding contact section for waterproof 1u outside the shaft cylinder section 1g forms the sliding surface "b" on the outer circumferential surface thereof.

On the outer circumference of the small diameter section 3c of the spool shaft 3 and on the rear side of the shaft cylinder section 1g, the spacer 18, another sliding contact member for waterproof 2B on the rear side and the click gear 19, which are the same as that of the first embodiment are engaged and interposed between the shaft cylinder section 1g and the step section 3b.

Other points of structure are the same as those of the first embodiment.

[Sixth Embodiment]

Figure 10:
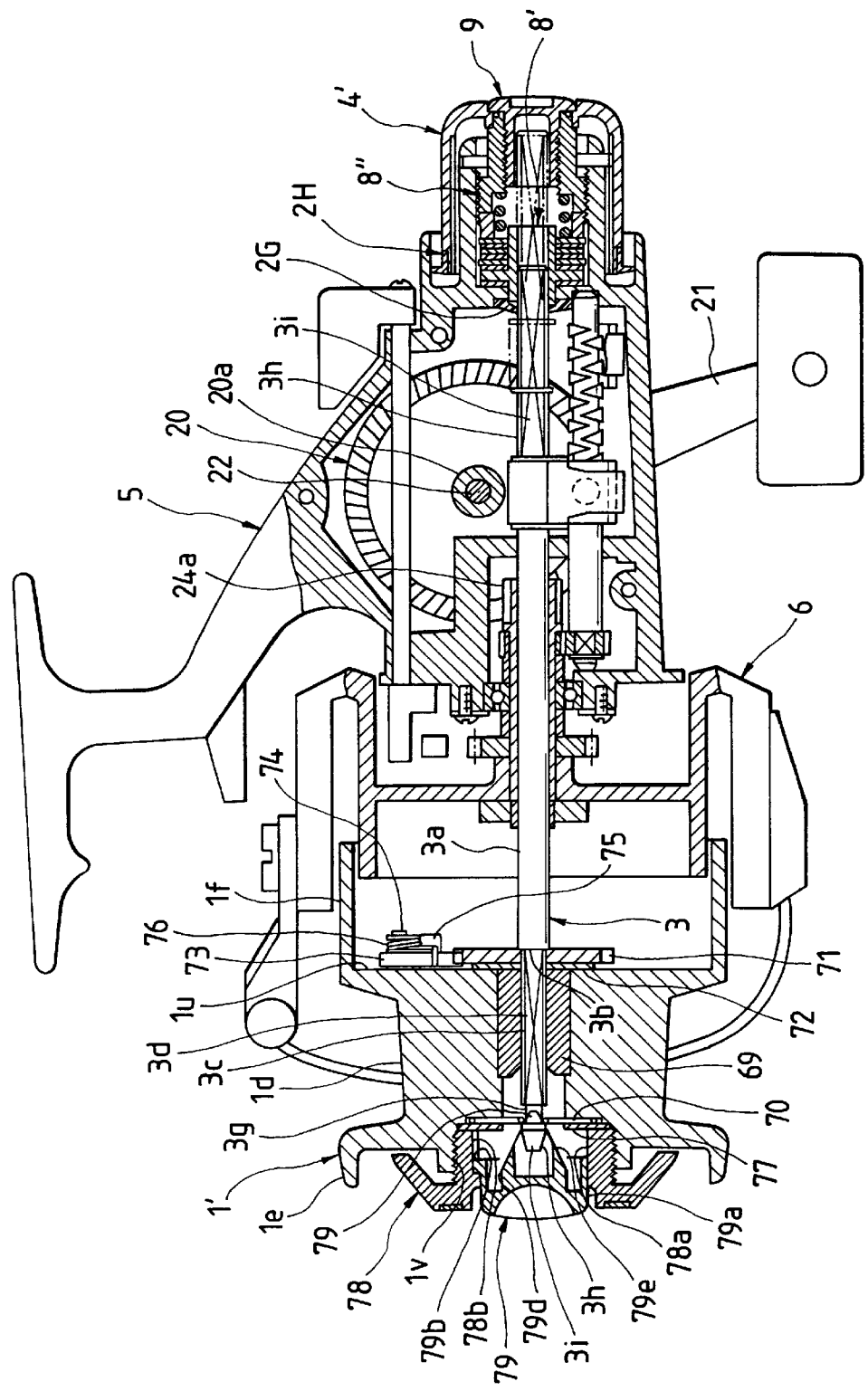
FIG. 10 is a cross-sectional side view of a fishing spinning reel according to a sixth embodiment of the present invention.
Figure 11:
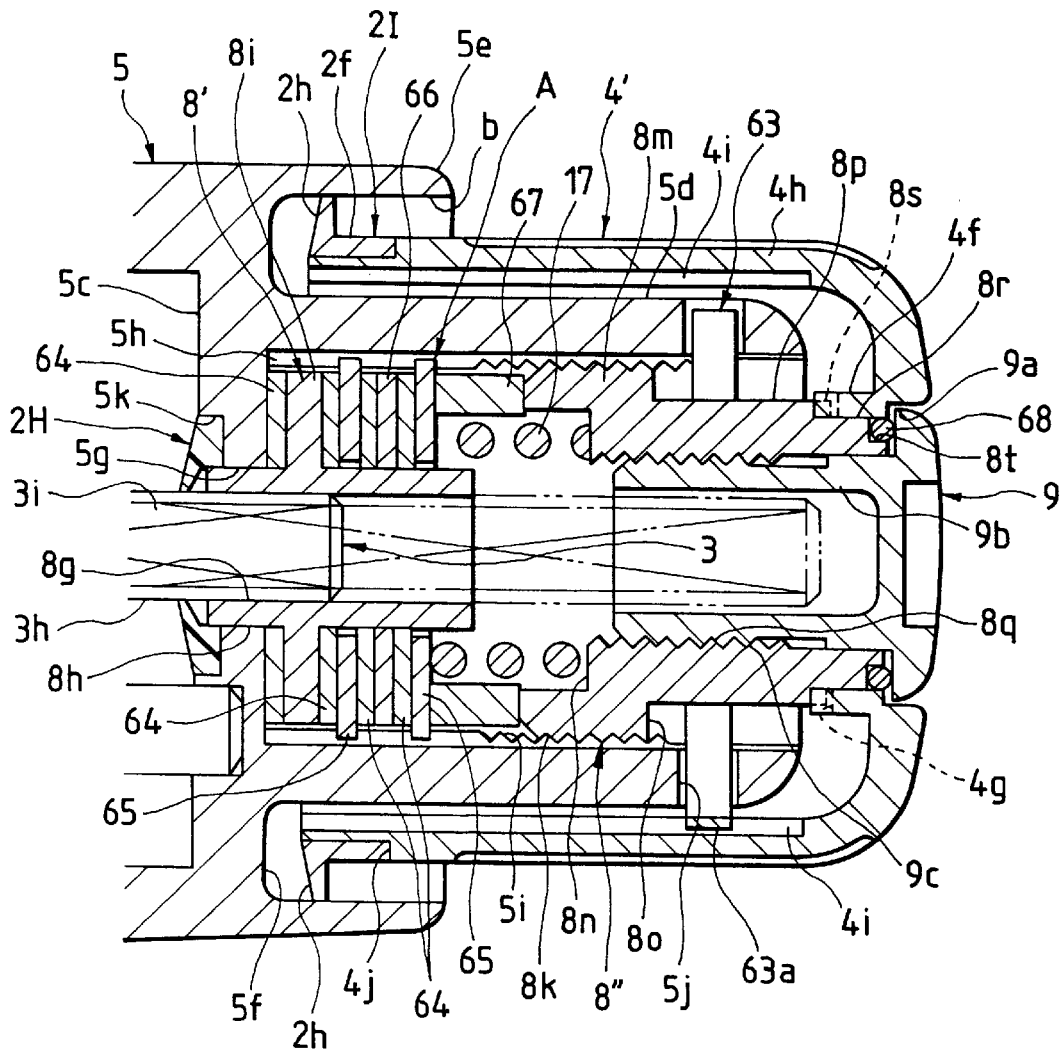
FIG. 11 is an enlarged cross-sectional side view of a reel body and a drag braking knob on the rear side according to the sixth embodiment.
Figure 12:
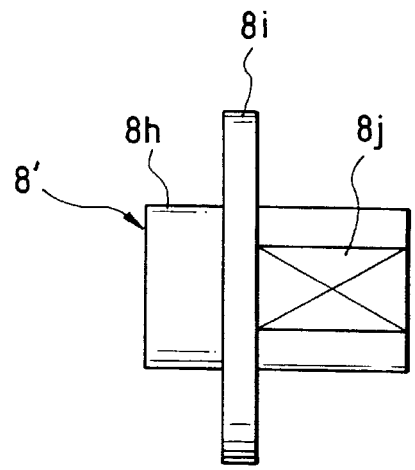
FIG. 12 is a side view of a braking metal member according to the sixth embodiment.
Figure 13:
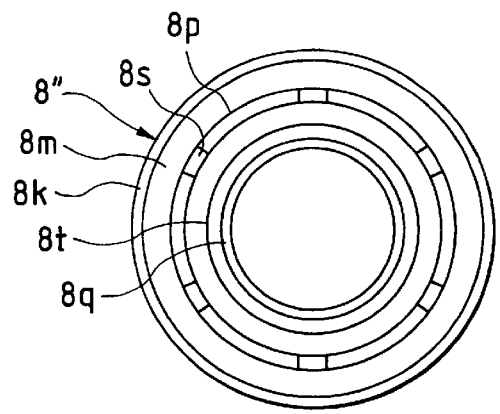
FIG. 13 is a rear view of a pushing member according to the sixth embodiment.
Figure 14:
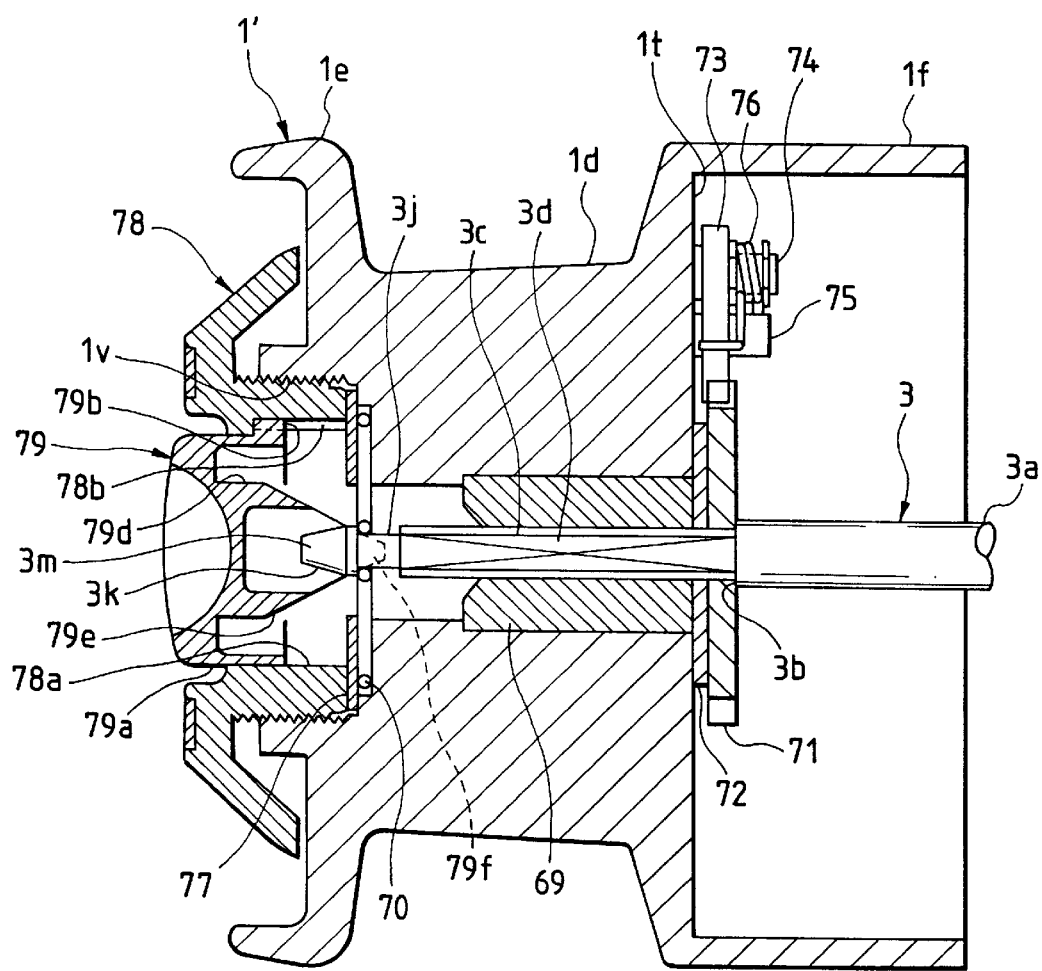
FIG. 14 is a cross-sectional side view of a spool according to the sixth embodiment.

FIGS. 10 to 14 are views showing a sixth embodiment of the present invention. FIG. 10 is a cross-sectional side view of a fishing spinning reel. FIG. 11 is an enlarged cross-sectional side view of a reel body and a drag braking knob, wherein the view is taken on the rear side. FIG. 12 is a side view of a braking metal member. FIG. 13 is a rear view of a pushing member. FIG. 14 is a cross-sectional side view of a spool.

The sixth embodiment is a rear drag type fishing spinning reel. The cylindrical sections 5d, 5e are protruded backward from the rear side wall 5c of the opposite member 5 composed of the reel body.

Outside the cylindrical section 5d, there is formed a sliding contact section for waterproof 5f composed of a recess, and the outer circumferential surface thereof is defined as the sliding surface "b".

On the rear side wall 5c, there is formed a hole 5g, which is engaged with one end of the braking metal member 8'.

In the cylindrical section 5d, there are formed two grooves 5h and a screw section 5i along the axial direction.

On the opening end side of the cylindrical section 5d, there is formed a through-hole 5j perpendicular to the axial direction.

In the front portion of the rear side wall 5c, there is formed a recess 5k, with which the sliding contact member for waterproof 2H is engaged and fixed.

On the inner circumferential surface of an elastic flange portion, the wall thickness of which is small, of this sliding contact member for waterproof 2H, the outer circumference of the spool shaft 3 is pivotally and slidably contacted.

At the center of the braking metal member 8', there is formed a through-hole 8g for locking. On the outer circumference 8h, there is formed a flange section 8i. On the rear side of the flange section 8i, there is formed a locking section 8j.

The spool shaft 3 includes the extending section 3h, which further extends rearward from the rear end section 3f of the first embodiment. On the outer circumference of the extending section 3h, there is formed a locking section 3i, and the extending section 3h is engaged in the through-hole 8g for locking in such a manner that it can be freely moved in the longitudinal direction.

The friction plate 64 of drag braking mechanism A is closely engaged with the outer circumferential section 8h on the front side of the flange section 8i. The friction plate 64 and the braking plates 65, 66 are engaged with the outer circumferential section 8h on the rear side of the flange section 8i. The braking plate 66 is locked by the locking section 8j.

Protrusions formed on the outer circumference of the braking plate 65 are engaged with two grooves 5h, so that the braking plate 65 can not be rotated.

The braking plate 65 on the rear side comes into pressure contact with the pushing ring 67 and the spring 17. The pushing member 8'' screwed to the screw 5i is contacted with the pushing ring 67 and the spring 17.

The pushing member 8'' includes: a cylindrical section 8m of large diameter, on the outer circumference of which a screw section 8k is formed; a cylindrical section 8p of intermediate diameter, which is formed by the outside and the inside step section 8n, 8o; a screw section 8q on the inner circumference of the cylindrical section 8p; a small diameter section 8r formed on the rear side of the cylindrical section 8p via a step section; an engaging protrusion 8s formed at this step section; and a holding section 8t for holding an O-ring 68, arranged at the rear end of the cylindrical section 8p and constructed by a step section.

As shown in FIG. 13, there are provided a plurality of engaging protrusions 8s which are protruded backward from the circumference of the cylindrical section 8p.

The inside cylindrical section 4f of the drag braking knob 4' is contacted with the outer circumference of the small diameter section 8r.

The drag braking knob 4' includes: an inside cylindrical section 4f; an engaging recess 4g formed at the forward end of the inside cylindrical section 4f; an outside cylindrical section 4h connected to the inside cylindrical section 4f; a click tooth section 4i formed on the inner circumference of the outside cylindrical section 4h; and a recess 4j formed on the outer circumference of the forward end on the front side of the outside cylindrical section 4h.

The engaging recess 4g is engaged with the engaging protrusion 8s.

The O-ring 68 is pressed by the flange section 9a of the screw plug 9 which is screwed to the screw section 8q, and thus, the inside of the cylindrical section 5d is made waterproof.

The screw plug 9 is constructed by a flange section 9a, a cylindrical section 9b and a screw section 9c on the outer circumference of the cylindrical section 9b.

The claw 63a of the click spring 63 is inserted into the through-hole 5j and engaged with the click tooth section 4i.

The engaging recess 4j is engaged with and fixed to the elastic sliding contact section 2f of the sliding contact member for waterproof 21.

The flange section 2h of the sliding contact section 2f is slidably contacted with the sliding surface "b" of the sliding contact section for waterproof 5f composed of a recess.

As shown in FIG. 14, on the front end side of the spool shaft 3, there are provided a circumferential groove 3j formed on the front side of the small diameter section 3c, and a trapezoidal section 3m formed by the oblique surface 3k.

The small diameter section 3c is pivotally engaged with a bearing sleeve 69, which is engaged with and fixed to the central through-hole it of the spool 1', and locked by the circumferential groove 3j and a spring 70 so that it can not come out.

The spring 70 is composed in such a manner that two parallel bent sections and the circumferential section are integrated into one body like a clip-shape.

Accordingly, the spool shaft 3 includes: the large diameter section 3a, a front end small diameter section 3c extending from the large diameter portion 3a via the step section 3b; a locking section 3d formed on the outer circumference of the small diameter section 3c; the circumferential groove 3j; and the trapezoidal section 3m formed by the oblique surface 3k. Further, at the rear end section 3f of the spool shaft 3, there are formed the extending section 3h and the locking section 3i.

The spool 1' includes: a fishing line winding barrel section 1d; a flange section 1e on the front side; a large diameter cylindrical section 1f on the rear side; a rear surface 1t within the cylindrical section 1f; and a recess 1v on the front side.

Further, a ratchet gear 71 and a washer 72 are fitted with the small diameter section 3c and interposed between the step section 3b and the rear surface 1t of the spool 1'.

On the rear surface 1t of the spool 1', an engagement body 73 is pivotally supported to a shaft 74.

A pin 75 is fixed on the side of the engagement body 73. One end of a spring 76 is retained at the engagement body 73, and the other end is retained at the pin 75, so that the engagement body 73 is energized to the pin 75 side by the spring 76.

The forward end of the engagement body 73 is detachably engaged with the ratchet gear 71. The ratchet gear 71 prevents the spool 1' from rotating in the direction of drawing out the fishing line 10 which is wound round the spool 1', that is, the fishing line 10 is prevented by the ratchet gear 71 from being drawn out.

On the front side of the spool 1', there is formed a recess 1v. The spring 70 is inserted into the recess 1v in such a manner that the spring 70 can be idly moved in the circumferential direction. Further, a washer 77 is inserted into the recess 1v, and a male screw of a cap 78 is engaged with a female screw of in the recess 1v.

A push button 79 is fitted into a cylindrical hole 78a of the cap 78 in such a manner that the push button 79 can be freely advanced and retreated in the cylindrical hole 78a.

On one side in the cylindrical hole 78a of the cap 78, there is provided an engagement section 78b composed of several grooves formed in the axial direction.

An outer circumferential cylindrical section 79a of the push button 79 is fitted in the cylindrical section 78a, and the engaging section 79b is formed so as to protrude from the cylindrical section 79a, so that the engaging section 79b is engaged with the engaging section 78b.

A cylindrical section 79d is projectingly formed at the rear of the push button 79, and a sharp end section 79f is formed by oblique surfaces 79e, 79e which are arranged in an upper and a lower portion of the cylindrical section 79d.

The forward end of the sharp end section 79f is made smaller than the interval of the two parallel bent sections of the spring 70.

The sliding mechanism, which is arranged in parallel to the spool shaft 3 in the opposite member 5 composed of the reel body, is substantially the same as that of the first embodiment.

In the sixth embodiment, the drag braking force is adjusted in the following manner. When the drag braking knob 4' is rotated, the pushing member 8" is made to advance or retreat in the axial direction. When the pushing member 8" is made to advance in the axial direction, the friction plate 64 of drag braking mechanism A, the flange section 8k, the friction plate 64, the braking plates 65, 66, the pushing ring 67 and the coil-shaped spring 17 are pushed, so that the braking force can be intensified and adjusted.

When the drag braking knob 4' is further rotated, the flange section 2h of the elastic sliding contact section 2f of the sliding contact member for waterproof 2I slidably comes into contact with the sliding surface "b" of the sliding contact section for waterproof 5f composed of a recess and advances and retreats.

In order to disengage the spool 1' from the spool shaft 3, the push button 79 is pushed in, so that the spring 70 is extended by the oblique surfaces 79e, 79e on the front side of the sharp end section 79f. In this way, the spool 1' can be disengaged from the spool shaft 3.

In the sixth embodiment, it is possible to prevent water from entering the cylindrical section 5d of the opposite member 5 composed of the reel body, and also it is possible to prevent water from entering the drag braking knob 4'.

[Seventh Embodiment]

Figure 15:
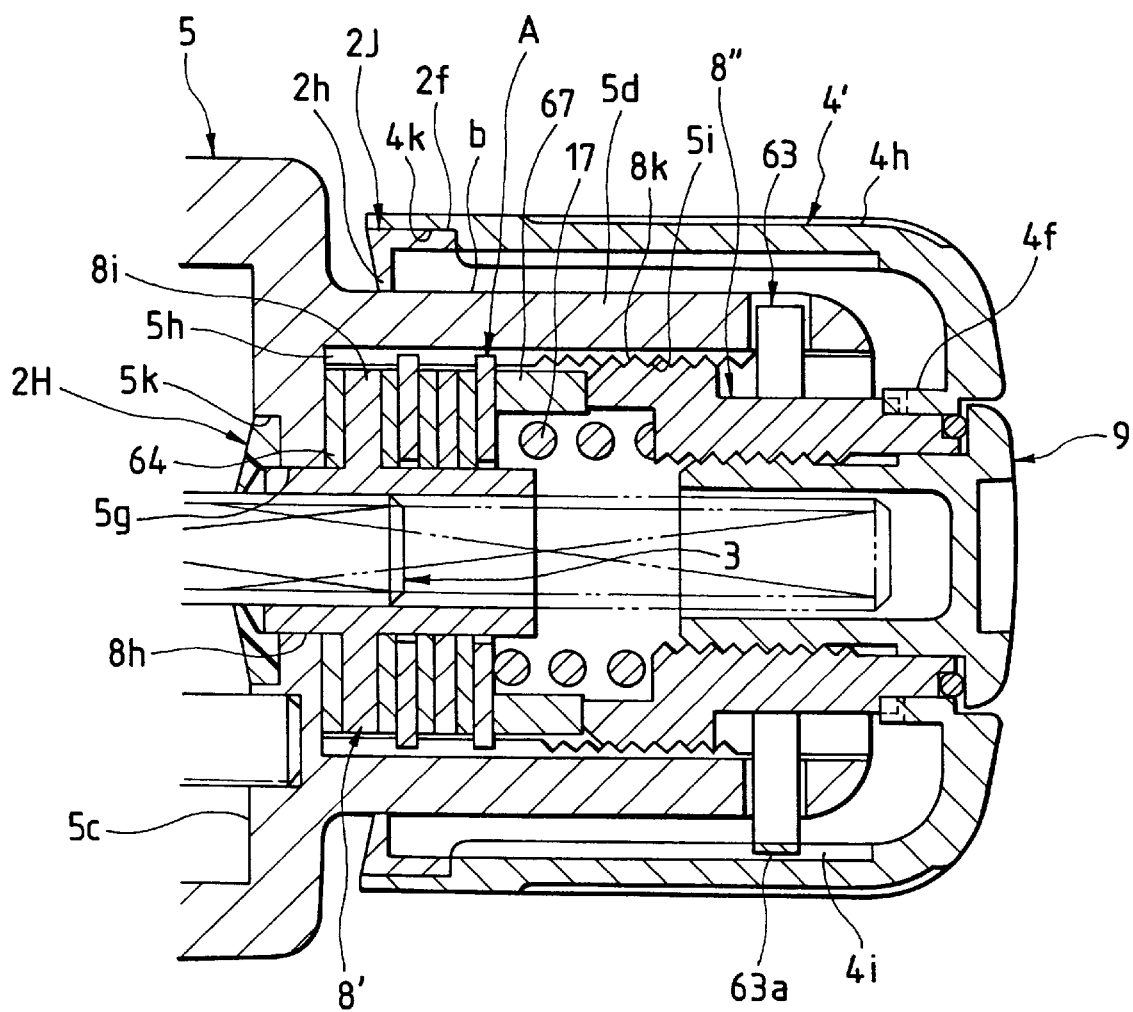
FIG. 15 is an enlarged cross-sectional side view of a reel body and a drag braking knob on the rear side according to a seventh embodiment of the present invention.

FIG. 15 is a view showing a seventh embodiment of the present invention. FIG. 15 is an enlarged cross-sectional side view of the reel body on the rear side and the drag control knob.

In the seventh embodiment, there is formed a recess 4k on the inner circumference on the front side of the outside cylindrical section 4h of the drag braking knob 4'.

The elastic sliding contact section 2f of the sliding contact member for waterproof 2J is engaged with and fixed to the recess 4k.

The cylindrical section 5d protrudes backward from the rear side wall 5c of the opposite member 5 composed of the reel body.

Outside the cylindrical section 5d, there is formed a sliding contact section for waterproof 5f composed of a step section, and the outer circumferential surface of this sliding contact section for waterproof 5f defines the sliding surface "b".

The flange section 2h of the sliding contact section 2f slidably comes into contact with the sliding surface "b" of the sliding contact section for waterproof 5f outside the cylindrical section 5d.

Other points of structure are the same as those of the sixth embodiment.

The present invention is executed according to the embodiments explained above. It is possible for the present invention to provide the following effects.

Even if dust or sand is attached to the sliding contact member for waterproof, the sliding contact section of the sliding contact member for waterproof is not disengaged from the sliding surface. Therefore, waterproof can be positively accomplished.

In the sliding contact members for waterproof arranged on the front and the rear side, there are provided elastic sliding contact sections. In the sliding contact sections, there are provided flange sections which protrude in the radial directions of the sliding contact sections for waterproof. Therefore, even if the flange section and the sliding surface are relatively moved, waterproof can be positively accomplished.

Even if dust or sand is attached to the sliding contact section for waterproof, it is scraped off when the flange section protruding in the radial direction is moved. Therefore, the flange section is not disengaged from the sliding surface. Accordingly, waterproof can be positively accomplished.

The flange section of the sliding contact member for waterproof arranged on the front side slidably comes into contact with the sliding surface of the sliding contact section for waterproof, and the flange section of another sliding contact member for waterproof arranged on the rear side slidably comes into contact with the sliding surface of the sliding contact section for waterproof arranged outside the shaft cylinder section. Due to the above arrangement, even if the reel is dipped in water, it is possible to prevent water from entering the opposite member and the drag braking knob.

The present disclosure relates to the subject matter contained in Japanese patent application No. Hei. 10-62048 filed on Feb. 26, 1998 which is expressly incorporated herein by reference in its entirely.

While only certain embodiments of the invention have been specifically described herein, it will apparent that numerous modifications may be made thereto without departing from the spirit and scope of the invention.

What is claimed is:

1. A fishing spinning reel comprising:
   a drag braking mechanism imparting a drag braking force to a spool, said drag braking mechanism having a drag braking knob being rotatable about a rotation axis;
   an opposite member opposite to said drag braking knob so as to receive said drag braking mechanism between said opposite member and said drag braking knob;

a first sliding contact section for a first waterproof seal arranged in one of said drag braking knob and said opposite member; and a first sliding contact member for said first waterproof seal arranged in the other of said drag braking knob and said opposite member, said first sliding contact member for said first waterproof seal includes a first contact portion elastically deformable and slidably contactable with a first sliding surface of said first sliding contact section for said waterproof seal;

a second sliding contact member for a second waterproof seal arranged around a spool shaft on an opposite side of said drag braking mechanism with respect to said drag braking knob along said rotation axis, said second sliding contact member having a second contact portion;

a second sliding contact section for said second waterproof seal opposing to said second sliding contact member for said second waterproof seal, said second sliding contact section defining a sliding surface to be contacted with said second contact portion of said second sliding contact member, whereby said drag braking mechanism arranged in said opposite member is made waterproof.

2. The fishing spinning reel according to claim 1, wherein said contact portion is formed by a flange section protruding toward a radial direction of said sliding contact section for said waterproof seal and being slidably contactable with said sliding surface of said sliding contact section for said waterproof seal.

3. The fishing spinning reel according to claim 2, wherein said flange section is slidably contactable with said sliding surface of said sliding contact section for said waterproof seal in conjunction with the movement of said drag braking knob.

4. The fishing spinning reel according to claim 1, wherein said opposite member is constructed by one of said spool and a reel main body.

5. The fishing spinning reel according to claim 1, wherein said second sliding contact member for said second waterproof seal is mounted on said spool shaft, said second contact portion is formed by a flange section which is slidably contactable with said opposite member being said second sliding contact section.

6. The fishing spinning reel according to claim 1, wherein said second sliding contact member for said second waterproof seal is attached to said opposite member, said second sliding contact section is defined by said spool shaft, and said second sliding contact member is slidably contactable with said spool shaft.

* * * * *